Figure 1:
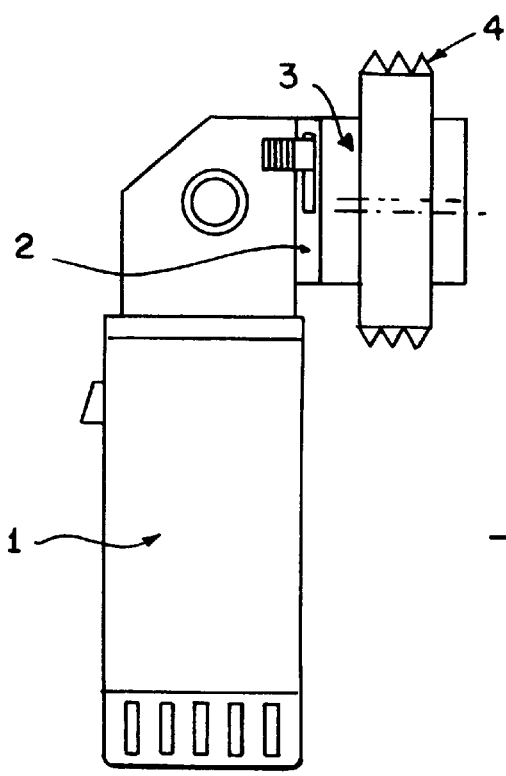

United States Patent
Bechem et al.

[11] Patent Number: 6,139,477
[45] Date of Patent: Oct. 31, 2000

[54] PROCESS FOR PRODUCING SLOTS, GROOVES, AND PLANAR EXCAVATIONS

[76] Inventors: Ulrich Bechem; Klaus Bechem; Philip Bechem, all of Tiefendorferstrasse 87, 58093 Hagen, Germany

[21] Appl. No.: 09/135,095

[22] Filed: Aug. 17, 1998

[51] Int. Cl.[7] ................................................. B23Q 3/157
[52] U.S. Cl. ................................ 483/1; 299/10; 409/131
[58] Field of Search ............................... 299/79.1, 10, 69, 299/39.1, 39.8, 95.42, 37.3, 39.3; 409/131, 132, 234; 408/20; 125/40, 13.01; 483/1; 451/57, 28, 342, 354, 65

[56] References Cited

U.S. PATENT DOCUMENTS

| | | | |
|---|---|---|---|
| 3,695,722 | 10/1972 | Fairweather et al. | 299/39 |
| 3,706,474 | 12/1972 | Nevenburg | 299/38 |
| 3,759,336 | 9/1973 | Marcovitz | 408/20 X |
| 3,778,113 | 12/1973 | Taylor | 299/86 |
| 4,040,668 | 8/1977 | Fairweather et al. | 299/86 X |
| 4,049,318 | 9/1977 | Fruin | 299/81 |
| 4,273,383 | 6/1981 | Grisebaci | 299/23 |
| 4,366,991 | 1/1983 | Hilshorst | 299/39 |
| 4,437,526 | 3/1984 | Gloor | 409/143 |
| 5,056,268 | 10/1991 | Wolff | 451/65 X |
| 5,083,839 | 1/1992 | Younger | 299/39 |
| 5,103,705 | 4/1992 | Bechem | 125/20 |
| 5,190,353 | 3/1993 | Bechem | 299/86 |

FOREIGN PATENT DOCUMENTS

| | | |
|---|---|---|
| 0 329 915 A1 | 8/1989 | European Pat. Off. . |
| 0 455 994 A2 | 11/1991 | European Pat. Off. . |
| 25 17 950 | 11/1976 | Germany . |
| 35 43 016 A1 | 6/1987 | Germany . |
| WO 97/22424 | 6/1997 | WIPO . |

Primary Examiner—William Briggs
Attorney, Agent, or Firm—Barnes & Thornburg

[57] ABSTRACT

A combination of conventional or superimposed percussive slot-cutting tools for creating slots and grooves, with eccentric, superimposed percussive, counterbalanced planar milling tools for excavating floors, walls, rocks, minerals and the like.

20 Claims, 5 Drawing Sheets

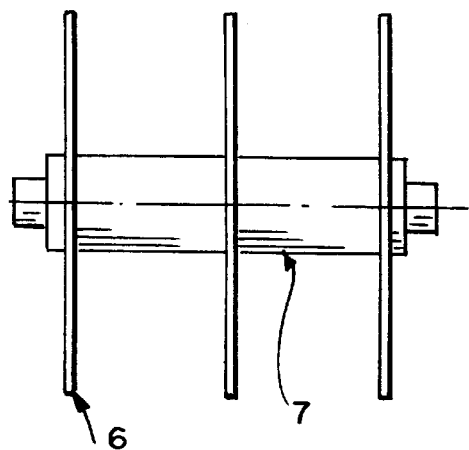
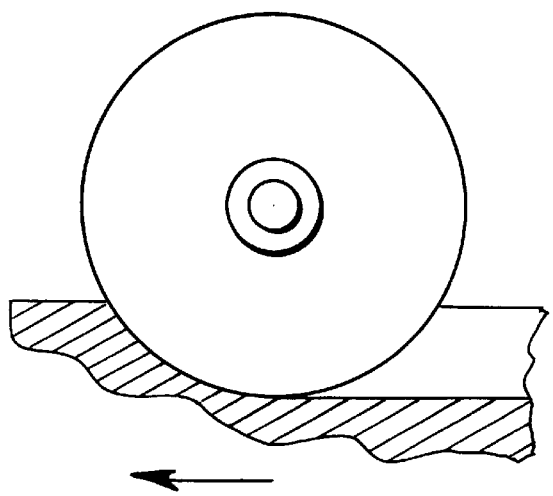
FIG. 3a　　FIG. 3b
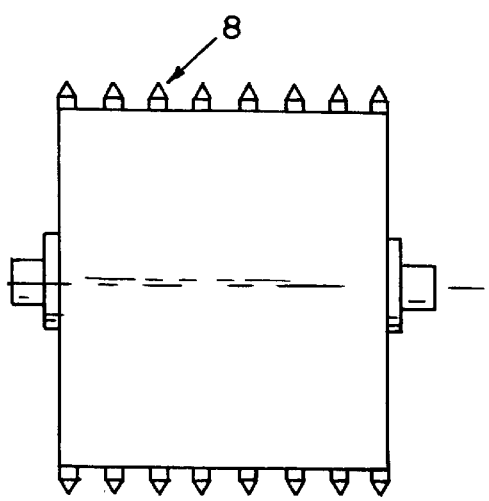
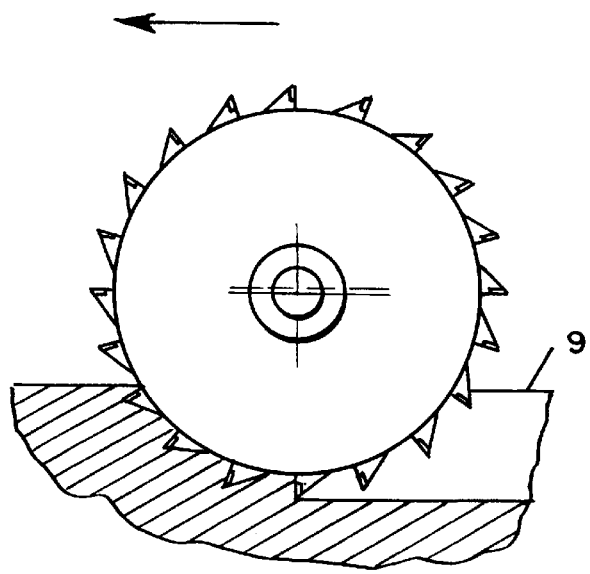
FIG. 4a　　FIG. 4b

PROCESS FOR PRODUCING SLOTS, GROOVES, AND PLANAR EXCAVATIONS

DESCRIPTION OF SYSTEM AND DRAWINGS

It is customary when creating slots or grooves in floors or walls, rocks, minerals or the like by manual means, in order to retrofit cables or pipes, for example, by manual means, to first form two slots by means of diamond cutting disks, and then to chisel out the residual intermediate ridge. Percussive milling tools on the other hand are curvilinear and mill hard materials, that is, they are faster and more efficient under normal conditions, but not in all circumstances during manually guided operations in extremely hard concrete.

In order to eliminate the corresponding disadvantages slot-cutting tools of the conventional or superimposed percussive kind are fitted to a drive according to the invention, and are alternately interchangeable with eccentrically, superimposed percussive, counterbalanced planar milling tools, and preferably operable at respectively optimum speeds.

In order to excavate not only grooves but also more broad-tracked and if need be deeper, planar milling may be practiced according to the invention by way of several cutting disks, for example, either conventionally or under activation, spaced apart about 100 to 300 mm from each other, precutting to a depth of 100 to 300 mm for example, and releasing the rock, mineral or the like for subsequent superimposed percussive milling to almost full depth, at comparatively low mass, high speed and low abrasion.

The eccentrically superimposed milling technology is set out in EP-A91105564.8-2313 and EP-B-0455994, and EP-A-88710058.4-2313 and EP-B-0329915.

Figure 2:
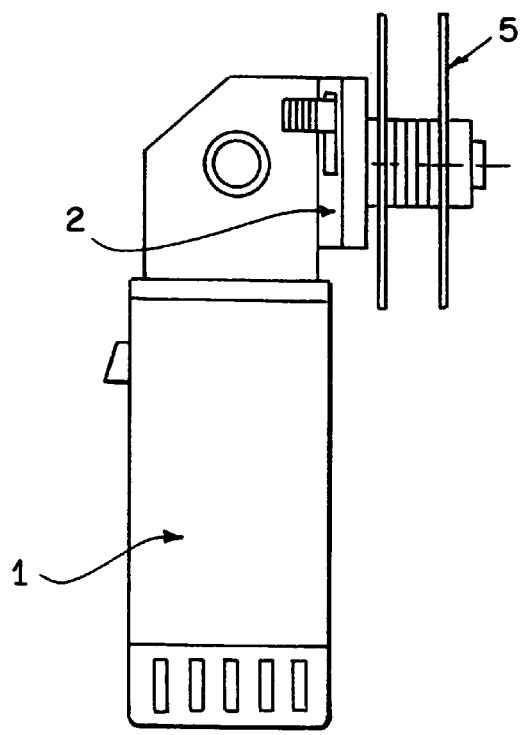
Figure 5:
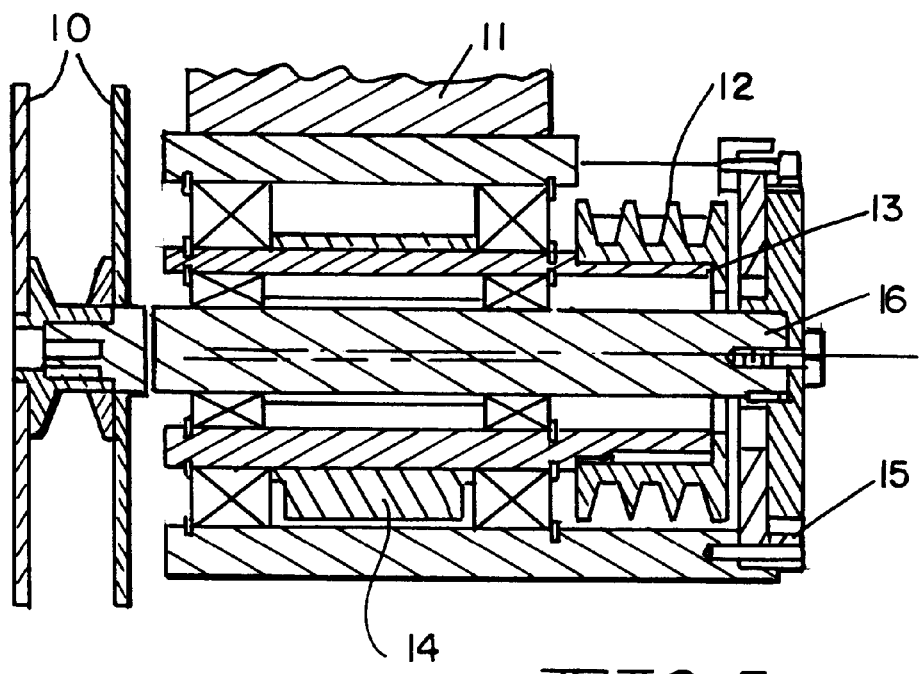

In FIG. 1, an example having a drive for two systems on a single drive shaft, in this case a hand-held device having an electrical power rating ranging from 1500 to 2000 Watt and a rotational speed between 6000 and 12000 revolutions per minute, for example, 1 is the drive motor, 2 is a quick-coupling for interchangeability, 3 is the superimposing percussive system on the rapidly rotating eccentric drive having a counterweight and a reduction gear train for a planar milling tool 4 operating under slowly rotating superimposed percussion only, or a single or dual slot-cutting tool (FIG. 2 and 5)

In FIG. 2, 1 is again the drive motor, 2 the quick-coupling for interchanging one system for the other. Items 5 in this case are two diamond cutting disks on the drive shaft, operating by direct conventional propulsion at 6000 up to 12000 revolutions per minute under superimposed percussion—spaced apart by the approximate width of the tool 4 in FIG. 1—applied according to the invention for slot-cutting, preferably for subsequent milling out of the residual intermediate ridge by way of the superimposed percussive tool, according to FIG. 1.

In FIGS. 3a–b, for example, 6 are several pre-slotting disks operating either by percussion or conventionally by respectively propelling the shaft 7 either slowly or rapidly.

In FIGS. 4a–b, the superimposed percussive tools 8 then mill the residual ridges 9 in a second operating pass with comparative ease. The interchangeability of both different systems on a single machine and/or shaft may be provided, the process is claimed.

FIG. 5 depict a superimposed percussive, dual slot-cutting tool 10, 11 is the holder for this special design and 12 is but one mode of propulsion for the rapidly rotating, driven eccentric sleeve 13 having a counterweight 14. The reduction gear train depicted by 15 comprising a pinion meshing with an internal ring gear in order to thereby slowly rotate a superimposed percussive shaft 16; in this case as an example of an alternative having an internal ring gear secured to a chassis.

Figure 6:
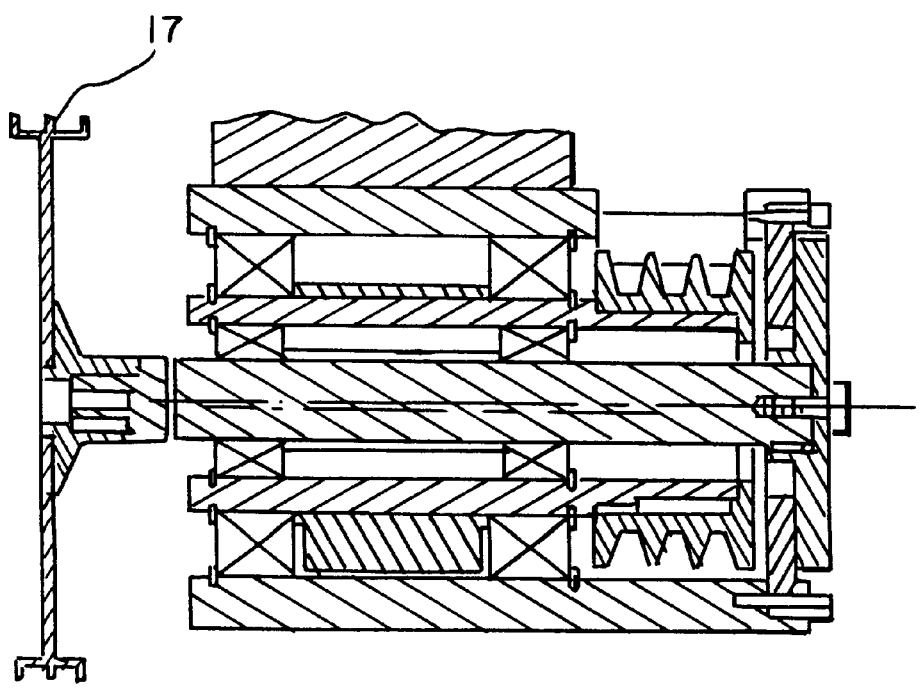

FIG. 6 corresponds to FIG. 5—apart from the single or multiple slot-cutting, or the depicted superimposed percussive planar milling tool 17 instead of the tool 10 of FIG. 5—fitted interchangeably.

Figure 7:
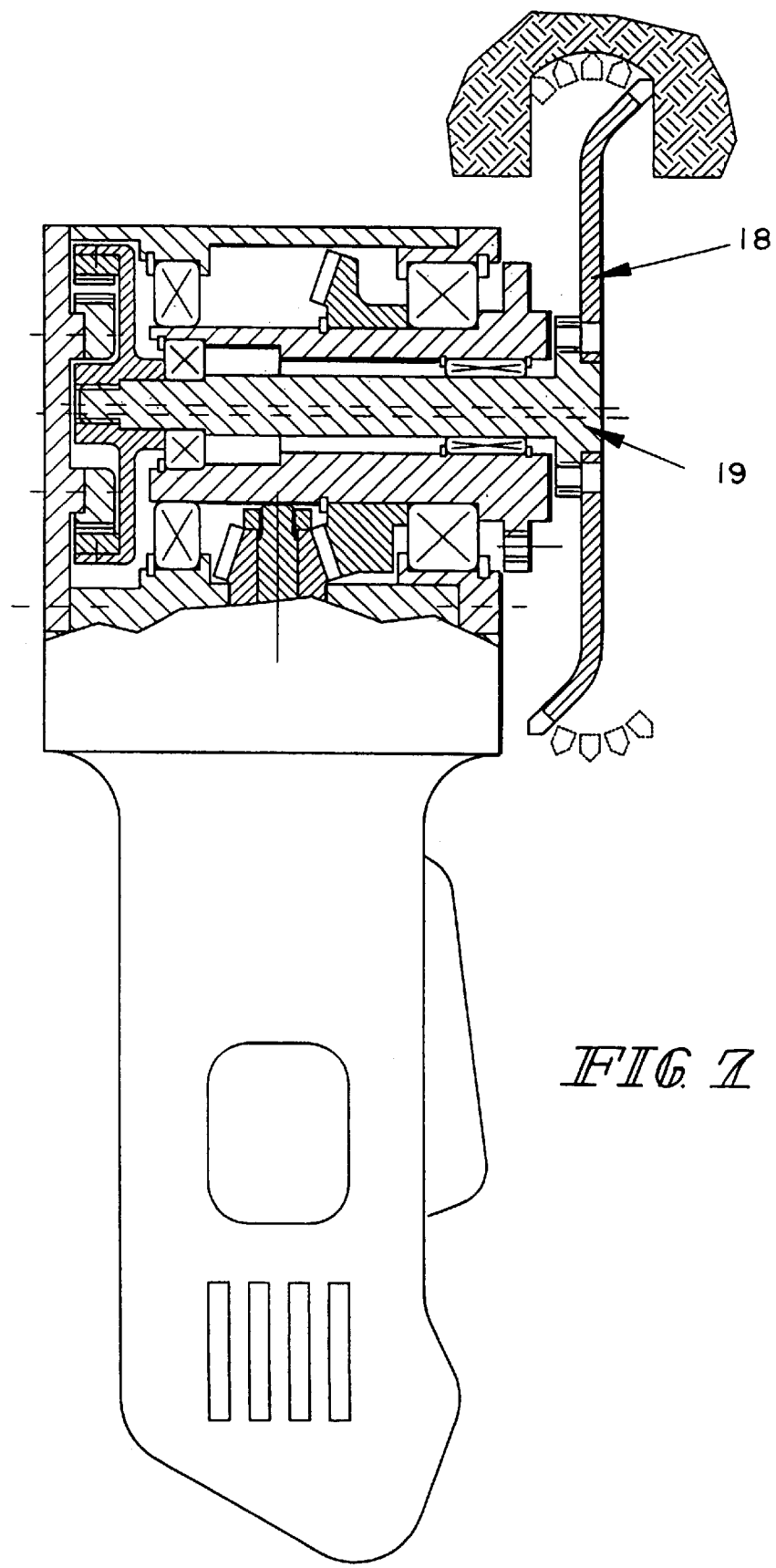
Figure 8:
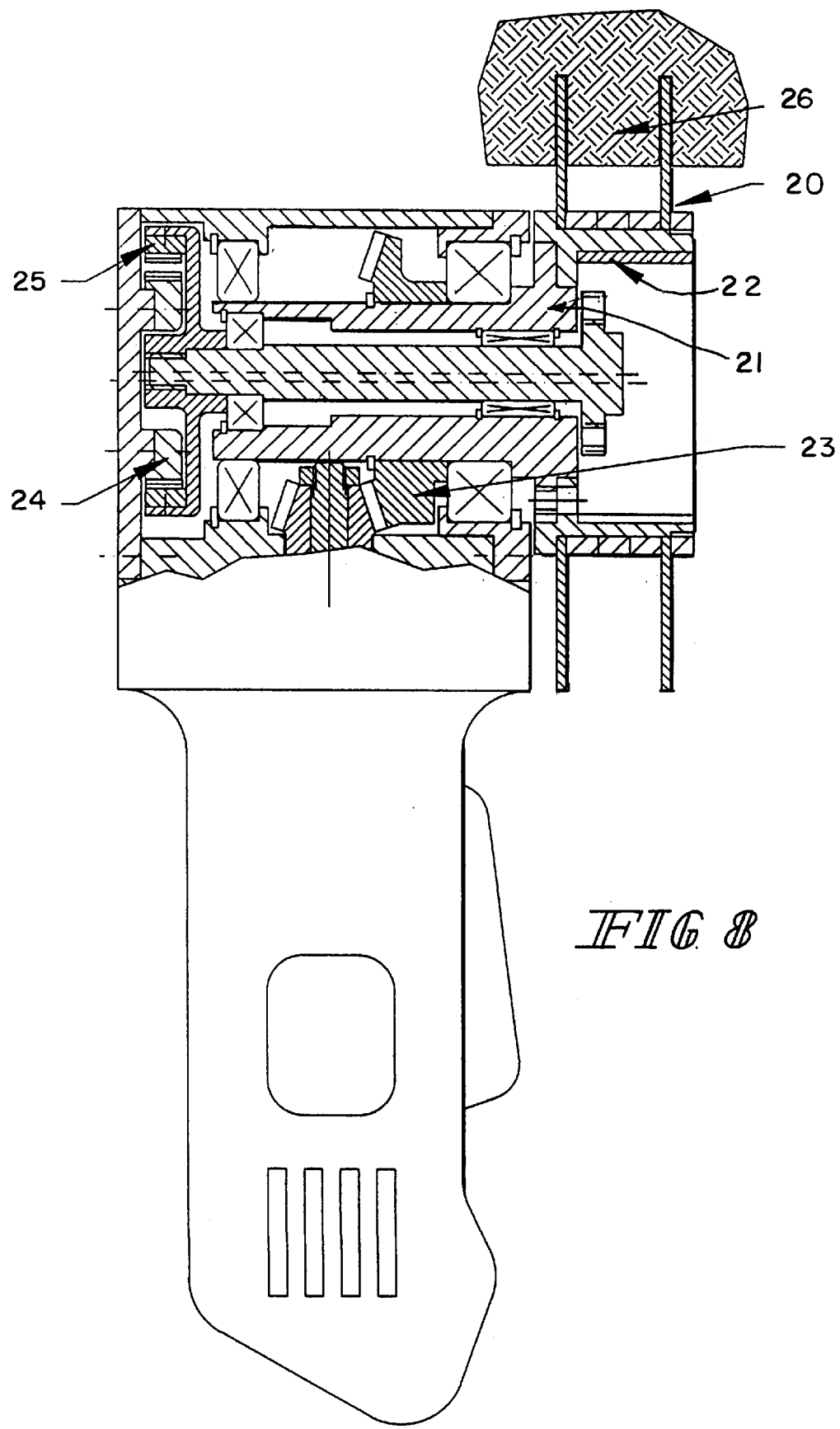

In FIGS. 7 and 8, a specially claimed design, a milling tool 18 shown in FIG. 7 fully excavates a slot of 30 mm width for example. The technology corresponds substantially to that of FIGS. 5 and 6, only the coupling and counterbalancing of the differently operating tools vary. In the case of FIG. 7, 18 is the fully excavating tool, which is interchangeably fitted to the comparatively slowly rotatable, driven shaft 19, operating radially percussively.

In FIG. 8 item 20 is a dual, conventional rapidly rotating, driven slot-cutting tool without superimposed percussion, which is fitted in this instance to the rapidly rotating eccentric shaft 21. Item 22 is the counterweight which is matched to the internal weight 23 of the eccentric shaft 21 for counterbalancing. Separate protection is claimed for the process of dual, conventional pre-slotting by means of the system of FIG. 8, and subsequently milling out the residual ridge 26 by superimposed percussion by means of the system of FIG. 7. In the design corresponding to FIGS. 7 and 8, 24 is the static pinion meshing with the internal ring gear 25 in speed-reducing eccentric fashion. This preferred optimized system corresponds to claim 9.

What is claimed is:

1. Process for producing at least one of slots, grooves, planar excavation of floors, planar excavation of walls, and planar excavation of minerals, the process including utilizing a drive to rotate a slot cutting disk in a first cutting, or excavation step, interchanging said disk with an eccentric, superimposed percussive, rotatable planar milling tool, and utilizing said tool in a second cutting or excavation step.

2. Process according to claim 1 wherein interchanging said disk with said tool on said drive includes interchanging at least one of a single slot-cutting disk and a multiple slot-cutting disk with an eccentric, superimposed percussive, counterbalanced planar milling tool.

3. Process according to claim 1 further including pre-cutting at least one of single slots and multiple slots and subsequently conducting eccentric, superimposed percussive planar milling to at least one of the left of the residual ridge, the right of the residual ridge, and the residual ridge.

4. Processes according to claim 1 further including first pre-cutting slots by way of two manually guided, driven disks arranged at a distance from each other, and thereafter, in a second operating pass milling out the exposed, residual ridge in eccentric, superimposed percussive fashion.

5. Process according to claim 1 wherein interchanging said disk with said tool includes counterbalancing said tool by matching its weight to a counterweight on said drive.

6. Process according to claim 1 wherein interchanging said disk with said tool includes dynamic balancing through compensating by mass.

7. Process according to claim 1 including at least one of fitting said disk to a shaft of said drive and flange-mounting said tool interchangeably to said drive.

8. Process according to claim 7 wherein interchanging said disk with said tool on said drive includes providing at least one of single and dual high-speed driven, conventionally rotating slot-cutting disks on said drive shaft with weights for counterbalancing.

9. Process according to claim 1 wherein interchanging said disk with said tool includes holding one of an externally toothed gear and an internally toothed ring gear of an eccentric, internally meshing gear combination static while the other of said externally toothed gear and said internally toothed ring gear rotates about it at a reduced rotational speed.

10. Process according to claim 1 wherein interchanging said disk with said tool on said drive includes stabilizing said drive in operation by at least one of its weight and a massive mechanical guide means.

11. Process according to claim 2 further including pre-cutting at least one of single slots and multiple slots and subsequently conducting, eccentric, superimposed percussive planar milling to at least one of the left of the residual ridge, the right of the residual ridge, and the residual ridge.

12. Processes according to claim 2 further including first pre-cutting slots by way of two manually guided, driven disks arranged at a distance from each other, and thereafter, in a second operating pass milling out the exposed residual ridge in eccentric, superimposed percussive fashion.

13. Processes according to claim 3 further including first pre-cutting slots by way of two manually guided, driven disks arranged at a distance from each other, and thereafter, in a second operating pass milling out the exposed residual ridge in eccentric, superimposed percussive fashion.

14. Process according to claim 2 wherein interchanging said disk with said tool on said drive includes counterbalancing said tool by matching its weight to a counterweight on said drive.

15. Process according to claim 3 wherein interchanging said disk with said tool on said drive includes counterbalancing said tool by matching its weight to a counterweight on said drive.

16. Process according to claim 4 wherein interchanging said disk with said tool on said drive includes counterbalancing said tool by matching its weight to a counterweight on said drive.

17. Process according to claim 11 wherein interchanging said disk with said tool on said drive includes counterbalancing said tool by matching its weight to a counterweight on said drive.

18. Process according to claim 12 wherein interchanging said disk with said tool on said drive includes counterbalancing said tool by matching its weight to a counterweight on said drive.

19. Process according to claim 13 wherein interchanging said disk with said tool on said drive includes counterbalancing said tool by matching its weight to a counterweight on said drive.

20. Process according to claim 2 wherein interchanging said disk with said tool on said drive includes dynamic balancing through compensating by mass.

* * * * *